(12) United States Patent
Chiang et al.

(10) Patent No.: US 11,994,970 B2
(45) Date of Patent: May 28, 2024

(54) DIAGNOSTIC SYSTEM

(71) Applicant: ASUSTeK COMPUTER INC., Taipei (TW)

(72) Inventors: Kun-Hsin Chiang, Taipei (TW); Hsin-Hui Huang, Taipei (TW); Wei-Hsian Chang, Taipei (TW); Wen-Yen Hsieh, Taipei (TW); Ming-Yi Huang, Taipei (TW); Yu-Chieh Chang, Taipei (TW); Tang-Hui Liao, Taipei (TW); Chih-Wei Kuo, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/141,443

(22) Filed: Jan. 5, 2021

(65) Prior Publication Data
US 2021/0216429 A1    Jul. 15, 2021

(30) Foreign Application Priority Data

Jan. 9, 2020   (TW) ................................ 109100805

(51) Int. Cl.
*G06F 11/22*   (2006.01)
*G06F 11/30*   (2006.01)
*G06F 11/32*   (2006.01)

(52) U.S. Cl.
CPC ........ *G06F 11/321* (2013.01); *G06F 11/2221* (2013.01); *G06F 11/3034* (2013.01); *G06F 11/324* (2013.01)

(58) Field of Classification Search
CPC ...... G06F 11/321; G06F 11/32; G06F 11/324; G06F 11/2221; G06F 11/2273; G06F 3/04817; G06F 3/04842
See application file for complete search history.

(56) References Cited

U.S. PATENT DOCUMENTS 4,746,854 A * 5/1988 Baker .................. H02J 7/0071
320/DIG. 19
6,072,299 A * 6/2000 Kurle ................ H01M 10/4257
320/132

(Continued)

FOREIGN PATENT DOCUMENTS

| CN | 1215419 C | 8/2005 |
| CN | 1753210 A | 3/2006 |

(Continued)

*Primary Examiner* — Yolanda L Wilson
(74) *Attorney, Agent, or Firm* — McClure, Qualey & Rodack, LLP

(57) ABSTRACT

A diagnostic system applied to an electronic equipment with a plurality of hardware devices is provided. The hardware devices include a display and a processor, the diagnostic system is executed by the processor to diagnose the hardware devices. The diagnostic system includes a diagnostic test interface, which is displayed on the display and includes a plurality of hardware items corresponding to the hardware devices. Each of the hardware items links to the hardware devices. When at least one of the hardware items is triggered, the processor executes the diagnostic item of the hardware device corresponding to the triggered hardware item.

12 Claims, 4 Drawing Sheets

(56) References Cited

U.S. PATENT DOCUMENTS

| | | | | |
|---|---|---|---|---|
| 6,477,665 B1* | 11/2002 | Bowman-Amuah | ... | G06F 11/22 712/244 |
| 6,480,727 B1* | 11/2002 | Gerdisch | ......... | H04W 52/0241 455/574 |
| 6,539,499 B1* | 3/2003 | Stedman | ............ | G06F 11/2273 705/29 |
| 9,207,800 B1* | 12/2015 | Eriksson | ............... | G06F 3/0421 |
| 2002/0147804 A1* | 10/2002 | Cosmao | ............ | H04L 12/2805 709/223 |
| 2006/0271322 A1* | 11/2006 | Haggerty | ............ | G06F 11/2273 702/108 |
| 2007/0096689 A1* | 5/2007 | Wozniak | ............ | G01R 31/3648 320/112 |
| 2009/0228842 A1* | 9/2009 | Westerman | .......... | G06F 40/166 715/863 |
| 2009/0249019 A1* | 10/2009 | Wu | .................... | G06F 12/0223 711/171 |
| 2009/0307384 A1* | 12/2009 | Liu | ....................... | G06F 11/221 710/19 |
| 2011/0153902 A1* | 6/2011 | Tsai | ..................... | G06F 13/385 710/313 |
| 2012/0153982 A1* | 6/2012 | Lee | ................. | G01R 31/31908 324/756.03 |
| 2013/0158915 A1* | 6/2013 | Humla | ................ | G01R 31/392 702/63 |
| 2014/0201566 A1* | 7/2014 | Best | ....................... | G06F 11/26 714/6.11 |
| 2016/0342328 A1* | 11/2016 | Rangarajan | ........... | G06F 3/0634 |
| 2017/0061030 A1* | 3/2017 | Fu | ........................ | G06F 16/278 |
| 2017/0205259 A1* | 7/2017 | Jang | ....................... | G01D 18/00 |
| 2018/0307290 A1* | 10/2018 | Montero | .............. | G06F 1/3212 |
| 2018/0337560 A1* | 11/2018 | Beckman | .................. | H02J 7/04 |

FOREIGN PATENT DOCUMENTS

| | | | | | |
|---|---|---|---|---|---|
| CN | 1858958 A | * | 11/2006 | | |
| CN | 102445666 B | | 5/2012 | | |
| CN | 102521092 A | | 6/2012 | | |
| CN | 102568522 B | | 7/2012 | | |
| CN | 102788910 A | * | 11/2012 | | |
| CN | 102866317 B | | 1/2013 | | |
| CN | 103336245 B | | 10/2013 | | |
| CN | 106970335 A | * | 7/2017 | | |
| CN | 107003758 A | | 8/2017 | | |
| CN | 107870304 A | | 4/2018 | | |
| GB | 2301217 A | * | 11/1996 | ........ | G06F 3/04883 |
| JP | 2007267284 A | * | 10/2007 | | |
| JP | 2007323506 A | * | 12/2007 | | |
| SU | 1746441 A1 | * | 7/1992 | | |
| TW | 200722986 A | * | 6/2007 | | |
| TW | I292528 B | | 1/2008 | | |
| TW | I459002 B | | 11/2014 | | |
| TW | I662407 B | | 6/2019 | | |

* cited by examiner

DIAGNOSTIC SYSTEM

CROSS-REFERENCE TO RELATED APPLICATION

This application claims the priority benefit of Taiwan applications serial No. 109100805, filed on Jan. 9, 2020. The entirety of the above-mentioned patent application is hereby incorporated by reference herein and made a part of specification.

BACKGROUND OF THE INVENTION

Field of the Invention

The invention relates to a diagnostic system of an electronic equipment.

Description of the Related Art

To ensure the stability of a computer system, system diagnostic tools are provided to assist in diagnosing computer hardware and software for abnormalities. Taking the x86 processor architecture as an example, operating system manufacturers, semiconductor manufacturers, and even third-party vendors would provide such tools and help to find out the problems on the components and deal with them.

However, due to the high complexity of the architecture platform, current diagnostic tools encounter problems with insufficient coverage, and cannot efficiently provide system analysis data. Moreover, the final diagnosis result is sometimes false-positive, which indicates that the computer system still has potential problems and might affect the stability of the system.

BRIEF SUMMARY OF THE INVENTION

According to one aspect, a diagnostic system applied to an electronic equipment with a plurality of hardware devices is provided. The hardware devices include a display and a processor, the diagnostic system is executed by the processor to diagnose the hardware devices. The diagnostic system includes a diagnostic test interface. The diagnostic test interface is displayed on the display and includes a plurality of hardware items corresponding to the hardware devices. Each of the hardware items links to the hardware devices. When at least one of the hardware items is triggered, the processor executes the diagnostic item of the hardware device corresponding to the triggered hardware item.

In summary, in order to ensure the stability of the system, the diagnostic system of this disclosure provides complete diagnostic test and data analysis for the hardware devices in the electronic equipment, to effectively find out abnormalities of the hardware devices, improve the yield of the hardware devices, and provide sufficient coverage of existing diagnostic tools.

These and other features, aspects and advantages of the present invention will become better understood with regard to the following description, appended claims, and accompanying drawings.

DETAILED DESCRIPTION OF THE EMBODIMENTS

Figure 1:
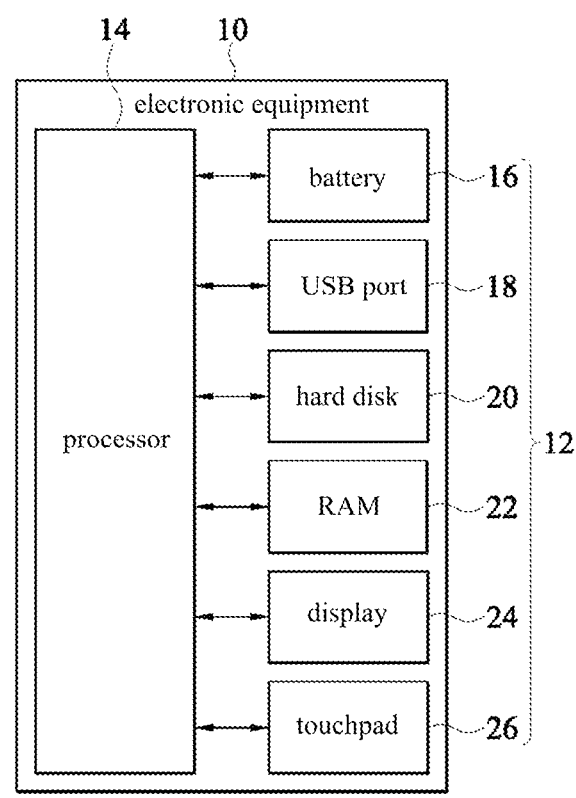
FIG. 1 is a schematic block diagram of an electronic equipment according to an embodiment.

A diagnostic system, which is applied to an electronic equipment with a plurality of hardware devices, is provided in this disclosure. The electronic equipment 10 shown in FIG. 1 includes a plurality of hardware devices 12. In an embodiment, the hardware device 12 is a processor 14, a battery 16, a Universal Serial Bus (USB) port 18, a hard disk 20, a random access memory (RAM) 22, a display 24, or a touchpad 26, which is not limited herein. The processor 14 is electrically connected to the battery 16, the USB port 18, the hard disk 20, the random access memory 22, the display 24, and the touchpad 26. In an embodiment, the processor 14 executes the diagnostic system to diagnose the hardware devices 12. In this embodiment, the electronic equipment 10 includes a display 24 and a touchpad 26. In other embodiments, the electronic equipment 10 only includes the display 24 or only includes the touchpad 26. In one embodiment, the display 24 is a touch screen. In one embodiment, the electronic equipment 10 is a notebook computer, a tablet computer, or a desktop computer, which is not limited herein.

Figure 2:
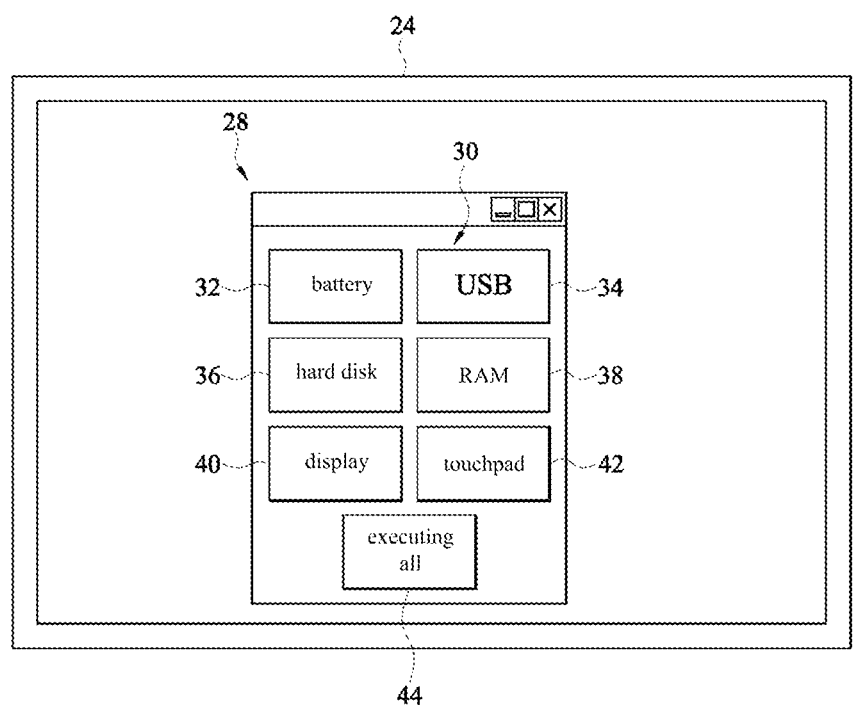
FIG. 2 is a schematic diagram showing a diagnostic test interface on a display of a diagnostic system according to an embodiment.

FIG. 2 is a schematic diagram showing a diagnostic test interface on a display of a diagnostic system according to an embodiment. Please refer to FIG. 1 and FIG. 2. The diagnostic system includes a diagnostic test interface 28 displayed on the display 24, all information provided by the diagnostic test interface 28 is displayed on the display 24. The diagnostic test interface 28 includes a plurality of hardware items 30 corresponding to each of the hardware devices 12. The hardware items 30 includes but not limited to a battery item 32, a USB item 34, a hard disk item 36, a random access memory item 38, a display item 40 and a touchpad item 42. Each of the hardware items 30 links to one of the hardware devices 12. When at least one of the hardware items 30 is triggered, the processor 14 executes a corresponding diagnostic item of the hardware device 12 according to the triggered hardware item 30. In detail, the battery item 32 links to the battery 16, and the processor 14 executes the diagnostic item of the battery 16 when the battery item 32 is selected by the user; the USB item 34 links to the USB port 18, and the processor 14 executes the diagnostic item of the USB port 18 when the USB item 34 is selected by the user; the hard disk item 36 links to the hard disk 20, and the processor 14 executes the diagnostic item of the hard disk 20 when the hard disk item 36 is selected by the user; the random access memory item 38 links to the random access memory 22, and the processor 14 executes the diagnostic item of the random access memory 22 when the random access memory item 38 is selected by the user; the display item 40 links to the display 24, and the processor 14 executes the diagnostic item corresponding to the display 24 when the display item 40 is selected by the user; and the touchpad item 42 links to the touchpad 26, and the processor 14 executes the diagnostic item of the touchpad 26 when the touchpad item 42 is selected by the user.

In one embodiment, the diagnostic test interface 28 further includes an "executing all" item 44, and when the "executing all" item 44 is selected, the processor 14 executes diagnostic tests on all the hardware devices 12 in sequence.

Figure 3:
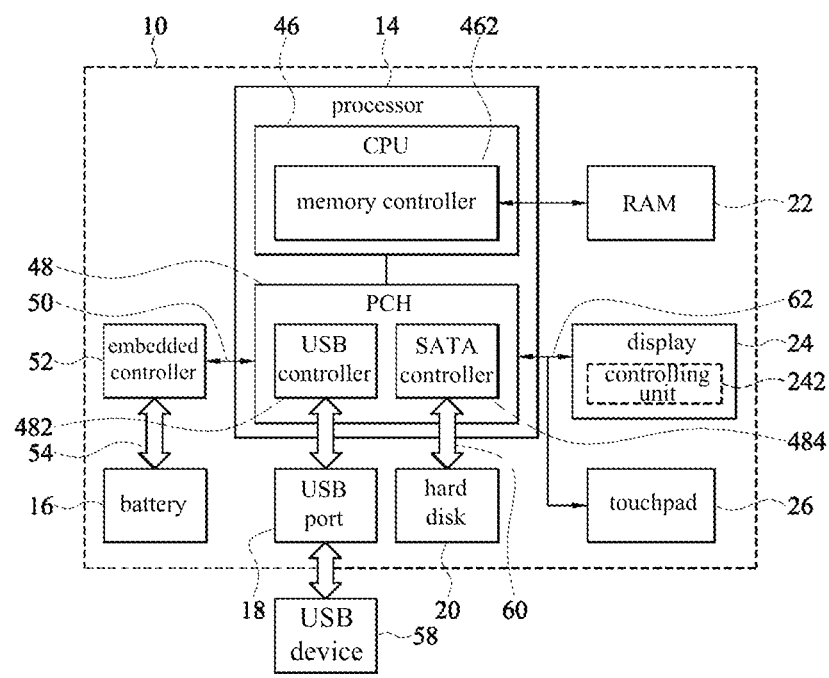
FIG. 3 is a block diagram of an electronic equipment according to an embodiment.

FIG. 3 is a block diagram of an electronic equipment according to an embodiment. Please refer to FIG. 1 to FIG. 3. In the electronic equipment 10, the processor 14 further includes a central processing unit (CPU) 46 and a platform controller hub (PCH) 48, and each of the hardware devices 12 corresponds to at least one diagnostic item respectively.

Figure 4:
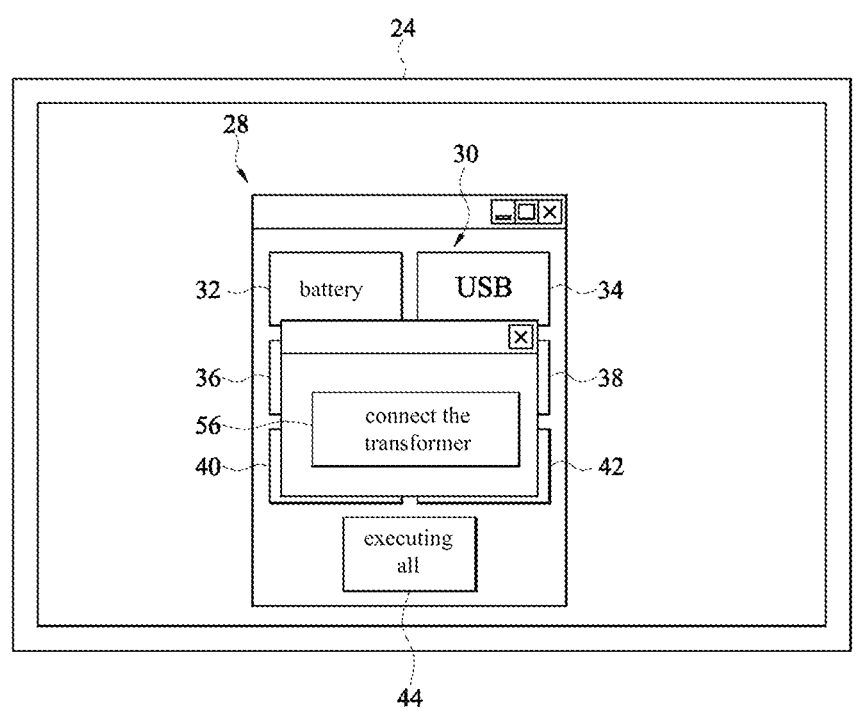
FIG. 4 is a schematic diagram showing a diagnostic test interface with a prompt window displayed on a display by a diagnostic system according to an embodiment.

As shown in FIG. 1 to FIG. 3, the platform controller hub 48 of the processor 14 is connected to an embedded controller 52 through a serial peripheral interface (SPI) or a transmission interface 50 of a low pin count interface (LPC), and the embedded controller 52 is connected to the battery 16 through a system management bus (SM Bus) 54 to execute the diagnostic item on the battery 16. The diagnostic item includes a hardware detection item, a battery capacity test item, a battery voltage test item, a charging test item, a battery core voltage balance test item, a battery temperature detection item, and a smart battery system data (SBS Data) check item. The hardware detection item includes detection of the brand, the manufacturer's name, serial number, fuel gauge IC, design voltage, and the EC number of the battery 16. The battery capacity test item includes testing relative state of charge (RSOC), life capacity, and cycle count. The battery voltage test item includes testing the shutdown voltage protection and the pre-charge current of the battery unit, to display the voltage of the current charging current. The charging test item includes confirming charging function of the battery 16 when the electronic equipment 10 is connected to a transformer (not shown). When the transformer is not detected, as shown in FIG. 4, a prompt window 56 is shown on the diagnostic test interface 28 to remind the user to connect the transformer for testing. The battery core voltage balance test item includes testing cell balance of the battery. When the voltage of the battery core is less than a rated value, such as 4.05 V, the battery 16 is determined to be abnormal. In an embodiment, when two battery units connected in series is fully charged, the voltage value of the two battery units should be 4.2 V. When the voltage of one of the battery units is only 3.8 V, it indicates that there is a problem with the battery unit, and the battery unit is determined to be abnormal. The battery temperature detection item includes detecting whether the temperature of the battery 16 is higher than a preset temperature, such as 60° C. When the temperature of the battery 16 is higher than 60° C., it indicates that the battery 16 is in an abnormal state. In an embodiment, excluding the high temperature of the battery 16 while charging, when the temperature of the battery 16 in other states is higher than the preset temperature, an abnormality is indicated. The preset temperature is dynamically adjusted according to the ambient temperature of the electronic equipment 10. The smart battery system data (SBS Data) check item includes checking whether there is any abnormality in the electronic-related data based on smart battery system specifications (common industry specifications). With the diagnostic item of the battery mentioned above, the CPU 46 of the processor 14 effectively control the lifetime of the entire battery 16, and ensures that users understand the current status of the battery 16 when using the battery 16.

As shown in FIG. 1 to FIG. 3, for the USB port 18, the platform controller hub 48 of the processor 14 is connected to the USB device 58 through a USB controller 482 and a USB port 18 to execute the diagnostic item on the USB device 58. The diagnostic item includes a connection detection item of the USB device 58, a type verifying item of the USB device 58, and a transmission rate item. For the connection detection item, the USB controller 482 of the platform controller hub 48 confirms the descriptor and attributes of the USB device 58 through hot plug detection, and determines whether to provide power. For the type verifying item and the transmission rate item, the USB controller 482 obtains information corresponding to the USB device 58 (such as serial number, manufacturer string, or product string) according to the descriptor, and obtains the bcdUSB field to verify that the USB device is USB 3.0, USB 2.0 or USB 1.1. After verifying the device type, the USB controller 482 transmits the corresponding protocol packet according to its type, and confirms whether the transmission rate of the USB device 58 matches its device type. For example, the transmission rate of the USB 3.0 device type is 5G bps, the transmission rate of the USB 2.0 device type is 480M bps, and the transmission rate of the USB 1.1 device type is 12M bps. Accordingly, whether the device type of the USB device 58 corresponding to the matched actual transmission rate is determined, and whether there is a problem with the USB device 58 or a problem with the USB port 18 is then further determined.

As shown in FIG. 1 to FIG. 3, the platform controller hub 48 of the processor 14 is connected to the hard disk 20 through a SATA controller 484 and a SATA bus 60 to execute the diagnostic item on the hard disk 20. The diagnostic item of the hard disk 20 includes a parameter determining item, and the processor 14 compares an index value of the hard disk 20 with a preset specification value to determine the status of the hard disk 20. Since the design parameters of each hard disk manufacturer are different, in order to effectively improve the diagnostic coverage, the CPU 46 obtains the hard disk parameter specifications information of each models of all the hard disk manufacturers in advance. The processor 14 uses the hard disk protocol (such as ATA command) to identify the manufacturer and the model of the hard disk 20, reads the index value (such as ID197 and ID05) of the attribute of the self-monitoring analysis, and reporting (such as Self-Monitoring Analysis and Reporting Technology, S.M.A.R.T.) through the hard disk protocol. Next, the processor 14 compares the index value with the specification value in the hard disk parameter specification information of the corresponding model to determine the status of the hard disk 20. With the parameter determining item mentioned above, the processor 14 is provided with more attributes to immediately monitor the hard disk of each brand, and effectively monitor the health status of the hard disk.

As shown in FIG. 1 to FIG. 3, the CPU 46 of the processor 14 is connected to the random access memory 22 through a memory controller 462 to execute the corresponding diagnostic item on the random access memory 22. The diagnostic item of the random access memory 22 includes a memory scanning item under the Linux operating system. Windows operating system divides the entire random access memory into physical memory space and virtual memory space according to the memory usage status, to allocate the entire memory resources according to system optimization. However, the virtual memory space (such as unusable memory space) is reserved by the Microsoft operating system, the memory health status of the virtual memory space cannot be obtained by conventional diagnostic tools, therefore, a blue screen of death (BSoD) due to a problem of this virtual memory space might be occurred. Therefore, when the CPU 46 performs the memory scanning item on the random access memory 22, it enters the Linux operating system and scans the entire random access memory 22 under the Linux operating system. In addition, the CPU 46 efficiently and accurately confirms whether the virtual memory space is abnormal by using memory management methods such as Cache, Buffer, or Program under the Linux operating system.

As shown in FIG. 1 to FIG. 3, the platform controller hub 48 of the processor 14 is connected to a controlling unit 242 of the display 24 through a transmission interface 62 of an integrated circuit bus (I2C) or a universal serial bus (USB) to perform the corresponding diagnosis item on the display 24. The diagnostic item of the display 24 includes an XY axis scanning test item, an XY axis line drawing test item, a touch plane noise self-scanning item, and a ghost-point self-test item. The XY axis scanning test item includes scanning of the X and Y axes of the display 24. The XY axis line drawing test item includes driving the display 24 to drawing line along the X and Y axes of the display 24 to determine whether the X and Y axes are broken. The touch plane noise self-scanning item includes detecting the capacitance value (finger capacitance value and sensing capacitance value) of the entire plane of the display to determine whether the capacitance value is too high. When there is no touch behavior, the finger capacitance value should detect nearly zero, but when there is a high capacitance value, it indicates that there is noise. Therefore, monitoring the touch plane noise self-scanning item helps to improve the stability and reliability of the display. The ghost-point self-test item includes placing the display flat without touching, and confirming whether the cursor moves. When the cursor moves, it may be caused by an unstable grounding caused by an assembly problem or a firmware problem. Therefore, monitoring the ghost-point self-test item ensures the reliability of the display assembly grounding.

As shown in FIG. 1 to FIG. 3, the platform controller hub 48 of the processor 14 is electrically connected to the touchpad 26 through the integrated circuit bus (I2C) or the transmission interface 62 of the universal serial bus (USB), to perform the corresponding diagnostic item on the touchpad 26. The diagnostic item of the touchpad 26 also includes a XY axis scanning test item, a XY axis line drawing test item, a touch plane noise self-scanning item and a ghost-point self-test item. The detailed description of each the diagnostic item is the same as the aforementioned embodiment and is not repeated here.

In summary, in order to ensure the stability of the system, the diagnostic system of this disclosure provides complete diagnostic test and data analysis for the hardware devices in the electronic equipment, to effectively find out abnormalities of the hardware devices, and solve the problem of insufficient coverage of existing diagnostic tools.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A diagnostic system, applied to an electronic equipment with a plurality of hardware devices, the hardware devices include a display and a processor, the diagnostic system is executed by the processor to diagnose the hardware devices, the diagnostic system comprises:

a diagnostic test interface, displayed on the display, and includes a plurality of hardware items corresponding to the hardware devices, each of the hardware items links to the hardware devices, wherein, the processor in response to execute a diagnostic item of the hardware device when at least one of the hardware items is triggered, wherein the diagnostic item of a battery includes each of: a hardware detection item, a battery capacity test item including testing relative state of charge (RSOC), life capacity, and cycle count, a battery voltage test item including testing a shutdown voltage protection and a pre-charge current of the battery, a charging test item, a battery core voltage balance test item measuring a voltage of the battery core relative to a rated value for testing a cell balance of the battery, a battery temperature detection item, and a smart battery system data check item, and when the voltage of the battery core is less than the rated value in the battery core voltage balance test item, the battery is determined to be abnormal;

wherein the hardware devices further include at least one of the battery, a USB port, a random access memory, or a touchpad; and wherein the diagnostic item of the USB port includes at least one connection detection item of a USB device, a type verifying item of the USB device and a transmission rate item of the USB device; wherein the connection detection item includes the processor confirms a descriptor and attributes of the USB device through hot plug detection to determine whether to provide power; and the type verifying item and the transmission rate item include the processor obtains information corresponding to the USB device according to the descriptor, and obtains a bcdUSB field to verify a device type of the USB device, then the processor transmits a corresponding protocol packet according to the device type, and confirms whether the transmission rate of the USB device matches the device type.

2. The diagnostic system according to claim 1, wherein the display is a touch screen.

3. The diagnostic system according to claim 1, wherein the processor is connected to an embedded controller through a serial peripheral interface or a low pin count interface, and the embedded controller is connected to the battery through a system management bus to perform the diagnostic item on the battery.

4. The diagnostic system according to claim 1, wherein the processor connects to the USB device through a USB controller and the USB port and executes the diagnostic item on the USB port and the USB device.

5. The diagnostic system according to claim 1, wherein the hardware devices further include a hard disk, and the diagnostic item of the hard disk includes a parameter determining item, the processor compares an index value of the hard disk with a preset specification value to diagnose the status of the hard disk.

6. The diagnostic system according to claim 5, wherein the processor is connected to the hard disk through a SATA controller and a SATA bus and executes the diagnostic item on the hard disk.

7. The diagnostic system according to claim 1, wherein the diagnostic item of the random access memory includes a memory scanning item under the Linux operating system.

8. The diagnostic system according to claim 7, wherein the processor connects the random access memory through a memory controller to execute the diagnostic item on the random access memory.

9. The diagnostic system according to claim 1, wherein the diagnostic item of the display or the touchpad includes an XY axis scanning test item, an XY axis line drawing test item, a touch plane noise self-scanning item, and a ghost point self test project.

10. The diagnostic system according to claim 9, wherein the processor is connected to a controlling unit of the display through an integrated circuit bus or the USB port to execute the diagnostic item on the display.

11. The diagnostic system according to claim 9, wherein the processor connects to the touchpad through the integrated circuit bus or the USB port to execute the diagnostic item on the touchpad.

12. A diagnostic system, applied to an electronic equipment with a plurality of hardware devices, the hardware devices include a display and a processor, the diagnostic system is executed by the processor to diagnose the hardware devices, the diagnostic system comprises:

a diagnostic test interface, displayed on the display, and includes a plurality of hardware items corresponding to the hardware devices, each of the hardware items links to the hardware devices, wherein, the processor in response to execute a diagnostic item of the hardware device when at least one of the hardware items is triggered, wherein the hardware devices further include at least one of a battery, a USB port, a random access memory, a touchpad or a hard disk;

wherein the diagnostic item of the hard disk includes a parameter determining item, the processor compares an index value of the hard disk with a preset specification value to diagnose the status of the hard disk, and the index value is obtained from the attribute of self-monitoring analysis and reporting Technology (S.M.A.R.T.) through a hard disk protocol;

wherein the diagnostic item of the display or the touchpad includes an XY axis scanning test item, an XY axis line drawing test item, a touch plane noise self-scanning item, and a ghost point self test project;

wherein the diagnostic item of the USB port includes at least one connection detection item of a USB device, a type verifying item of the USB device and a transmission rate item of the USB device; wherein the connection detection item includes the processor confirms a descriptor and attributes of the USB device through hot plug detection to determine whether to provide power; and the type verifying item and the transmission rate item include the processor obtains information corresponding to the USB device according to the descriptor, and obtains a bcdUSB field to verify a device type of the USB device, then the processor transmits a corresponding protocol packet according to the device type, and confirms whether the transmission rate of the USB device matches the device type.

* * * * *